ISABELLA C. DRAPER.
Fruit Forks.
No. 135,975. Patented Feb. 18, 1873.
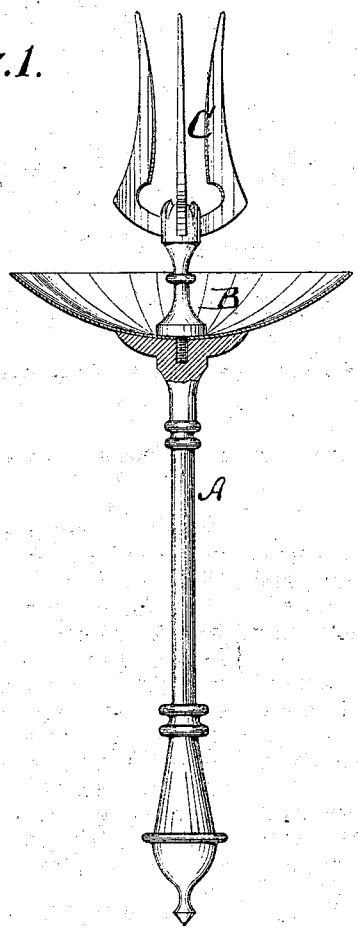
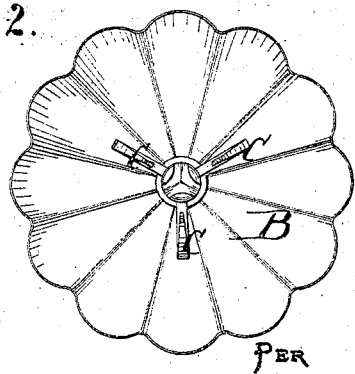

UNITED STATES PATENT OFFICE

ISABELLA C. DRAPER, OF NEW YORK, N. Y.

IMPROVEMENT IN FRUIT-FORKS.

Specification forming part of Letters Patent No. 135,975, dated February 18, 1873.

*To all whom it may concern:*

Be it known that I, Mrs. ISABELLA C. DRAPER, of the city of New York, in the county and State of New York, have invented a new and improved Fruit-Fork, of which the following is a specification:

Figure 1 represents a side view, partly in section, of my improved fruit-fork. Fig. 2 is a top view of the same.

Similar letters of reference indicate corresponding parts.

This invention relates to a new implement for holding fruit; and consists in the combination of a bowl or cup for gathering the juice with the prongs of the fork. The device will prevent injury to dresses, carpets, &c., by the juices of the fruit, and will furthermore constitute a convenient and ornamental article of household use.

A in the drawing is the handle, B the bowl or cup, and C C are the prongs or tines of my improved fruit-fork. The prongs are in suitable number and of proper length and shape. They project from the middle of the bowl, so that whatever juice may flow from the fruit will be collected in said bowl as long as it is held properly under the fruit. The handle is connected with the lower side or with one edge of the cup. It is represented to extend in a straight direction down, in line with the center of the cup, but may as well be horizontally applied to the latter—that is to say, at a right angle with the prongs or otherwise.

Having thus described my invention, I claim as new and desire to secure by Letters Patent—

The fruit fork, provided with the bowl or cup B, substantially as herein shown and described.

MRS. I. C. DRAPER.

Witnesses:
  A. V. BRIESEN,
  T. B. MOSHER.